Dec. 26, 1933.    J. A. GRIER    1,941,397

TERMINAL FOR REFRIGERATING APPARATUS

Filed Aug. 7, 1930

INVENTOR
John A. Grier.
BY
HIS ATTORNEYS.

Patented Dec. 26, 1933

1,941,397

UNITED STATES PATENT OFFICE

1,941,397

TERMINAL FOR REFRIGERATING APPARATUS

John A. Grier, New York, N. Y., assignor to Frigidaire Corporation, Dayton, Ohio, a corporation of Delaware Application August 7, 1930. Serial No. 473,594

3 Claims. (Cl. 173—311)

This invention relates to terminals for electrical devices and to a method of providing a terminal which will make a gas-tight seal in housings containing such devices.

It is sometimes highly desirable and often necessary to enclose an electrical apparatus within a sealed metal container. For example, refrigerating apparatus utilizing an irritating or poisonous gas as a refrigerating agent, are enclosed advantageously in a sealed metal container. In such case it is necessary to pass an insulated electrical conductor or terminal into the metal container, and it has been a problem to provide such a conductor which would withstand variations in temperature and pressure without breaking permitting leakage of gas from the container. It is therefore an object of the present invention to provide an improved, insulated, gas-tight, electrical terminal which may extend through an opening in the wall of the metal container in which is a refrigerant circulating unit including an electrically operated motor so that the enclosed motor can be connected with an outside source of electricity.

Another object of the invention is to provide an improved insulated electric terminal which will withstand variations in temperature and pressure within a sealed container.

A further object of the invention is to provide an improved terminal which can be cheaply manufactured and readily assembled on a sealed container for conducting electricity from the outside to the inside of the container.

Further objects and advantages of the present invention will be apparent from the following description, reference being had to the accompanying drawing, wherein a preferred form of the invention is clearly shown.

Figures 1, 2:
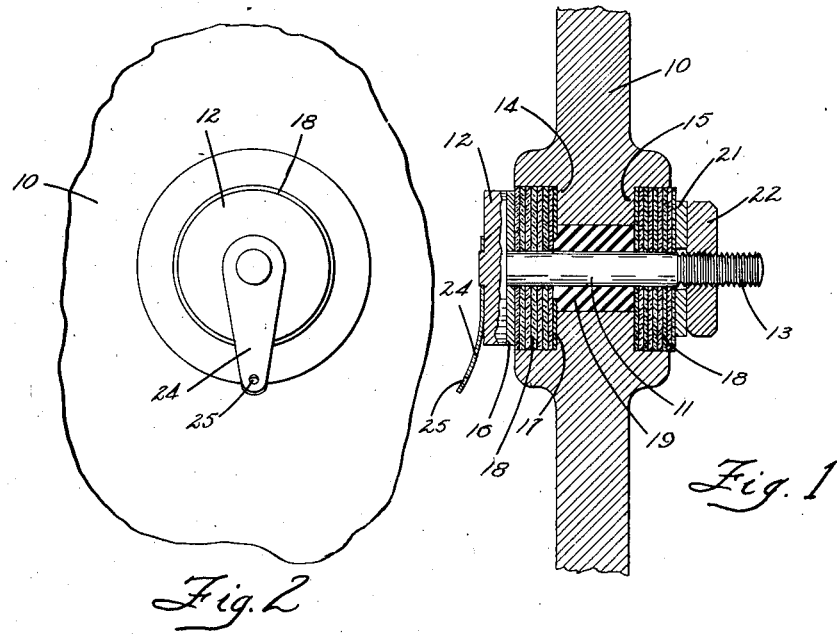
Fig. 1 is a vertical cross-section of a terminal constructed in accordance with the present invention.
Fig. 2 is an interior elevational view of the terminal shown in Fig. 1.

Referring to the drawing, 10 designates a wall of a sealed refrigerant circulating unit having enclosed therein a compressor and a motor for operating the compressor. The motor may be electrically operated and therefore must be supplied with electricity from a source outside the sealed unit. This necessitates the extension, through a wall of the sealed unit, of an insulated electrical terminal or conductor for transmitting electricity from the exterior of the unit to the motor enclosed therein. For this purpose I have provided a stud or bolt 11 having an enlarged head portion 12 and having its stem portion threaded as at 13. The stud or bolt 11 is adapted to be inserted in the opening in wall 10 so that its head 12 is on the interior of the container or unit. The opening in wall 10 is provided with shoulders 14 and 15 against which means such as washers are adapted to be clamped. On the inner side of the unit wall 10 between the enlarged head portion 12 of bolt or stud 11 and shoulder 14 I place lead washers 16 and 17. Cylindrical washers 18 located between the lead washers 16 and 17 may be made of mica so as to space and insulate the inner portion of the stud 11 from the wall 10. Lead washer 17 has a central hole therein which is considerably larger than the shank portion of bolt 11 so as to prevent a metal to metal contact at this point. On the outer side of wall 10 and surrounding bolt 11 there is located a plurality of the insulating washers 18 which engage the shoulder 15. A flexible bushing or resilient member 19 constructed of insulating material such as soft rubber or the like surrounds the stud 11 and is disposed in the opening of wall 10 between shoulders 14 and 15 so as to be in close proximity to the walls of the opening. A washer 21 and a nut 22 which nut is threaded upon the threads 13 is adapted to compress washers 16, 17 and 18 against shoulders 14 and 15. The bushing 19 is made slightly wider than the space between shoulders 14 and 15 and when the nut 22 is drawn up tight the bushing is compressed by the washers between the shoulders 14 and 15. By compressing the resilient bushing 19 in an axial direction it tends to expand radially, that is, the outer diameter thereof tends to increase and the inner diameter tends to decrease but are prevented from doing so after engaging the wall 10 and stud or bolt 11. In this manner the bushing 19 provides an efficient seal, for the opening through which the stud 11 extends, and prevents the escape of gases from the unit or container. Drawing of the nut 22 up tight to compress the bushing 19 and to move washer 17 on the one side of the wall 10 and washers 18 on the opposite side of the wall toward the wall causes washers 17 and 18 to tightly engage the wall 10 and the bushing 19 is thereby enclosed within the wall of the container. The bushing 19 is thereby sealed within the wall and is out of contact with the atmosphere on both sides of the wall and consequently out of contact with refrigerant adapted to be contained within the container formed by the wall 10. Thus the terminal more efficiently withstands variations in temperature and pressure and the life of the material from which the bushing is formed is prolonged. The enlarged head portion 12 of stud or bolt 11 has a clip 24 secured thereto and provided with an opening 25 to which the wire lead to the motor may be soldered.

From the foregoing description it is apparent that I have provided a terminal or conductor for conducting electrical energy from an outside source of supply to a motor enclosed within a metal container which may be cheaply manufactured and assembled. Furthermore I have provided a novel and efficient method of insulating the terminal, from a metal wall through which the terminal extends, and constructed the insulating material so that when this material is assembled it provides an efficient seal for preventing the escape of gases or other elements contained within a sealed container or unit.

While the form of embodiment of the invention as herein disclosed, constitutes a preferred form, it is to be understood that other forms might be adopted, all coming within the scope of the claims which follow.

What is claimed is as follows:

1. An electrical terminal adapted to conduct electrical energy through a wall of a container comprising in combination, a container, a metallic member extending through an opening in a wall of said container, means surrounding said metallic member on each side of the container wall and adapted to engage said wall, a flexible insulating bushing surrounding a portion of said metallic member and adapted to engage the wall of the opening in said container, said bushing being disposed between said means and normally preventing engagement of said means with said container wall, means for clamping said first named means against said bushing to compress said bushing against said metallic member and the wall of the opening in said container to provide a hermetic seal around said metallic member, and said last named means simultaneously clamping said first named means tightly against the wall of said container to substantially seal said bushing from atmosphere on both sides of said container wall.

2. An electrical terminal adapted to conduct electrical energy through a wall of a container comprising in combination, a container, a metallic member extending through an opening in a wall of said container, a plurality of thin flat washers surrounding said metallic member on each side of the container wall, at least one of said washers on each side of said container wall being adapted to engage said wall, a flexible bushing surrounding a portion of said metallic member and adapted to engage the wall of the opening in said container, said bushing being disposed between the washers adapted to engage said wall and normally preventing engagement thereof with the container wall, means for clamping the washers adapted to engage said wall against said bushing to compress said bushing against said metallic member and the wall of the opening in said container to provide a hermetic seal around said metallic member, and said last named means simultaneously clamping the washers adapted to engage said wall tightly against the wall of said container to substantially seal said bushing from atmosphere on both sides of said container wall.

3. An electrical terminal adapted to conduct electrical energy through a wall of a container comprising in combination, a container member, a metallic member extending through an opening in a wall of said container member, one of said members having a pair of oppositely directed, immovable shoulders, means surrounding said metallic member adjacent each of said shoulders and adapted to engage said shoulders, a flexible insulating bushing surrounding a portion of said metallic member and adapted to engage the wall of the opening in said container, said bushing being disposed between said means and initially preventing engagement of said means with said shoulders, means comprising a pair of relatively movable shoulders carried by the other member and opposed to each of said pair of immovable shoulders respectively for clamping said first named means against said bushing to compress said bushing against said metallic member and the wall of the opening in said container to provide a hermetic seal around said metallic member, and said last named means clamping said first named means tightly between said shoulders to substantially seal said bushing from atmosphere on both sides.

JOHN A. GRIER.